United States Patent [19]

Murr

[11] 3,853,117

[45] Dec. 10, 1974

[54] PRESSURE SENSING SYSTEM AND METHOD

[75] Inventor: William C. Murr, Piedmont, Calif.

[73] Assignee: Berkeley Bio-Engineering, Inc., Berkeley, Calif.

[22] Filed: May 15, 1972

[21] Appl. No.: 253,058

[52] U.S. Cl................ 128/2 V, 73/67.2, 73/398 R, 128/2.05 Z, 128/2.05 E, 128/2 P
[51] Int. Cl.............................................. A61b 10/00
[58] Field of Search ..... 128/2.05 Z, 2.05 D, 2.05 E, 128/2 P, 2 V; 73/67.2, 398 R

[56] References Cited
UNITED STATES PATENTS

| | | | |
|---|---|---|---|
| 2,320,390 | 6/1943 | Shmurak | 73/67.2 X |
| 2,716,887 | 9/1955 | Smith | 73/67.2 |
| 3,034,356 | 5/1962 | Bieganski et al. | 128/2 P X |
| 3,229,684 | 1/1966 | Nagumo et al. | 128/2 P |
| 3,290,922 | 12/1966 | Thompson | 73/67.2 X |
| 3,503,263 | 3/1970 | Intraub | 73/398 X |
| 3,625,199 | 12/1971 | Summers | 128/2 R |

FOREIGN PATENTS OR APPLICATIONS 982,930   2/1965   Great Britain ...................... 73/398

*Primary Examiner*—Kyle L. Howell
*Attorney, Agent, or Firm*—Harris Zimmerman

[57] ABSTRACT

A pressure sensing system for measuring fluid pressure of a living body employs a resonant sonic transponder implanted inside the living body. The resonant frequency of the transponder is a function of the fluid pressure impinging on the transponder. A sound signal is directed from the exterior of the body to the transponder, causing the transponder to emit a resonance signal. The resonance signal is received at the exterior of the body and converted to fluid pressure data.

2 Claims, 8 Drawing Figures

PATENTED DEC 10 1974 3,853,117
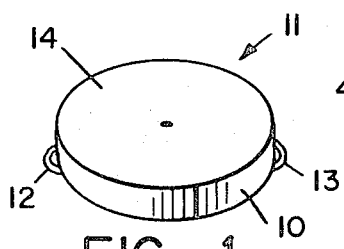
FIG_1
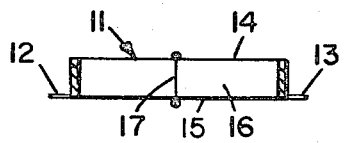
FIG_2
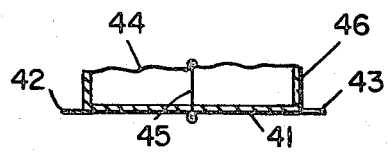
FIG_3
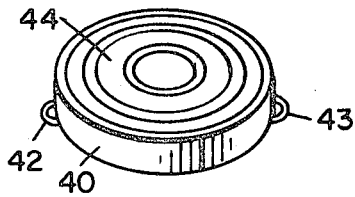
FIG_4
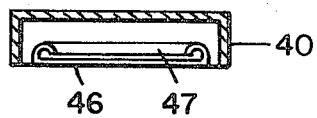
FIG_5
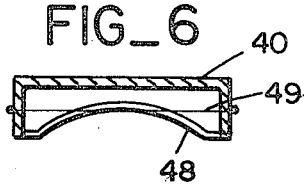
FIG_6
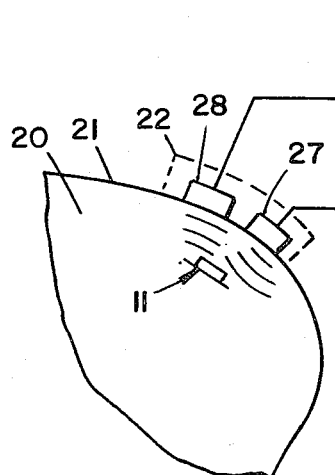
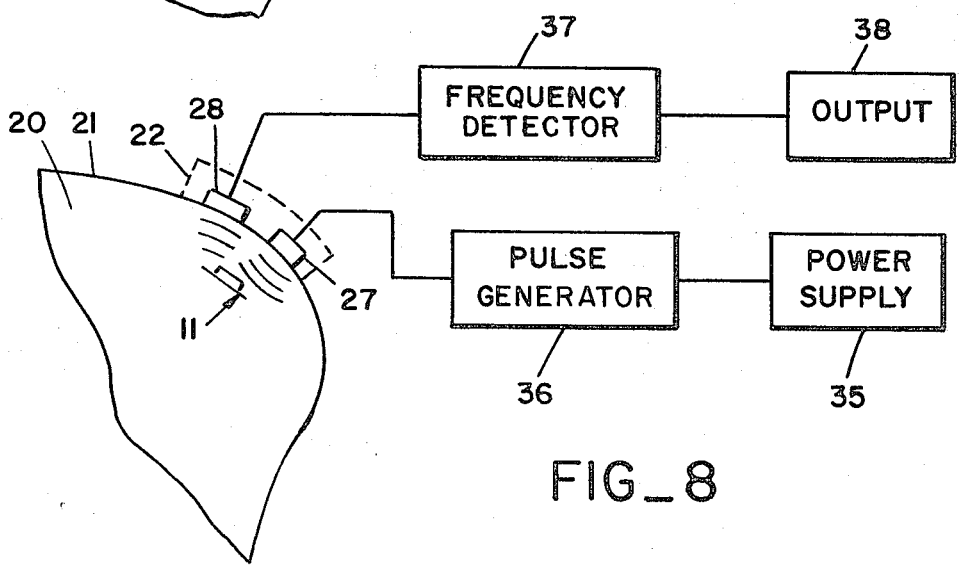

ature sensing system and method

BACKGROUND OF THE INVENTION

Various types of apparatus for measuring fluid pressure of a living body have long been available to physiological researchers and doctors. In general, these apparatus are either of the external type, such as the sphygmomanometer and tonometer, or the internal type, such as the implanted sensing device or various cannulation techniques. Because external pressure determination cannot measure fluid pressure within many body cavities, it often fails to provide vital pressure information about a patient or experimental subject. Cannulation, involving maintaining an opening into the body through which a tube may sample fluid, introduces a risk of infection or great physical discomfort to the patient. Therefore in many situations implanted pressure sensing devices are required.

Implanted sensing devices known in the prior art also have serious drawbacks. Passive systems, using received radio energy as their power source, have very low outputs. The weak signal is further attenuated by the electrolytes found in most body fluids, requiring ultrasensitive and therefore expensive monitoring equipment. Active systems employ batteries, which have limited operating lives, or wires leading to external power sources, which are subject to grounding problems and breakage, and can be painful.

THE DRAWINGS

FIG. 1 is a perspective view of one form of pressure transponder employed in the present invention.

FIG. 2 is a cross-sectional view of the embodiment shown in FIG. 1.

FIG. 3 is a view of a cross-section of another embodiment of the present invention.

FIG. 4 is a perspective view of the embodiment of FIG. 3.

FIG. 5 is a cross-sectional view of another embodiment of the present invention.

FIG. 6 is a cross-sectional view of a further embodiment of the present invention.

FIG. 7 is a schematic view of the transponder implanted in a cranium, with a block diagram of the instrumentation used in the transponder system.

FIG. 8 is a block diagram of another embodiment of the instrumentation employed with the transponder.

DESCRIPTION OF THE PREFERRED EMBODIMENTS

The transponder 11 shown in FIG. 1 and FIG. 2 is formed from a hollow cylindrical body 10 with an axial dimension less than the diameter. Protruding radially from one edge of the cylinder and diametrically opposed to each other are two ears 12 and 13 to secure the transponder in place within a body. Covering the open ends of the cylinder 10 are the upper diaphragm 14 and the lower diaphragm 15, enclosing a chamber 16 within. The chamber 16 is filled with a gas at known pressure. A fiber 17 under high tension joins the centers of the diaphragms 14 and 15. The fiber 17 in conjunction with the diaphragms 14 and 15 form a mechanically resonant structure with a resonant frequency dependant upon the tension of the fiber 17. As the pressure of the fluid surrounding the transponder changes, the force acting on the diaphragms 14 and 15 will change, causing the tension in the fiber to vary accordingly. Therefore the resonant frequency of the transponder will be a function of the pressure of the fluid.

The transponder 11 is shown in FIG. 7 implanted in the cranial cavity 20 of a subject. The transponder 11 may be placed on the dura mater, subject to the pressure of the fluid surrounding that membrane. On the exterior surface of the skull 21 is a transducer 22 which interrogates the transponder 11 with a sound signal and also receives the responding resonance signal. Both the skull 21 and the fluid inside it are good sound conductors, and because there are no intervening structures to attenuate the interrogating signal or the resonance signal, the measurement of intra-cranial pressure is a fitting task for the present invention.

The block diagram of FIG. 7 shows one embodiment of the electronic instrumentation. A power supply 25 provides regulated direct current to the circuitry. The frequency generator 26 emits an electrical signal of constant ultrasonic frequency. The transmitting transducer 27 converts this signal to ultrasonic vibrations which travel through the skull 21 and the cranial fluid, striking the transponder 11. The transponder 11, receiving this sonic energy, is driven into resonant vibration, the frequency of it depending on the pressure of the cranial fluid. The receiving transducer 28 receives both the resonance signal and the signal from the transmitting transducer 27. The demodulator 29 removes the signal of the frequency generator 26 from the received signal, which is then detected by the detector 30. The detected signal is conducted to an output device 31, which converts the frequency of the detected signal to cranial pressure data.

Another form of interrogation of the transponder is shown in block diagram form in FIG. 8. The power supply 35 provides regulated power to the circuitry. The pulse generator 36 produces a square pulse burst signal which is converted by the transducer 27 into a square pulse burst vibration which travels through the skull and the cranial fluid, striking the transponder 11. The transponder resonates in response to receiving the burst signal, at a frequency determined by the pressure of the cranial fluid. The resonance signal is received by transducer 28, and the frequency of the signal is detected by frequency detector 37. The detected frequency is then conducted to an output device 38 which converts the frequency to cranial pressure data.

It should be noted that because no electrical contact is made with the subject, the danger of accidental shock or electrocution is eliminated.

Another embodiment of the transponder 11 is shown in FIG. 3 and FIG. 4. It consists of a hollow cylindrical body 40 closed at one end by plate 41. Mounting ears 42 and 43 hold the transponder 11 in place after implantation. An annularly corrugated diaphragm 44 seals the end of the cylinder, creating a reference pressure chamber within. A fiber 45 under high tension extends from the center of diaphragm 44 to the center of plate 41. The diaphragm and fiber form a mechanically resonant structure with a resonant frequency varying with the surrounding fluid pressure. Because of the form of the diaphragm 44, it has greater flexibility than a flat diaphragm, and can undergo a greater excursion from the rest position when vibrating.

The embodiment shown in FIG. 5 uses a body structure similar to the transponder of FIG. 3 and FIG. 4, but with a new form of diaphragm. The diaphragm is a compound construction, comprising a flexible membrane 46, sealing the open end of the body, forming a reference pressure cavity within. Secured to the inside surface of the diaphragm 46 is a flexible annular ring 47 with a curving, open cross-section. The ring 47 provides spring tension by being forced to increase its diameter as the diaphragm 46 is forced inward by increasing fluid pressure. The curved diaphragm 46 also changes its length of arc as it flexes. Thus a change in pressure will alter both the tension and the length of the vibrating diaphragm, creating greater resonant frequency variation with changing pressure.

The embodiment of FIG. 6 also utilizes the same body structure as shown in FIGS. 3 and 4, with a different diaphragm configuration. The diaphragm 48 is a flexible membrane which bows inward as the exterior pressure increases, increasing its contact with the tensioned member 49. The tensioned member 49, which can be a fiber or a diaphragm, thus has its tension and its vibrating length altered by the fret-stop action of the impinging diaphragm 48. This action provides increased variation in resonant frequency as the fluid pressure changes.

Thus it can be seen that the present invention provides an accurate means of measuring fluid pressure within body cavities that overcomes all of the objectionable characteristics of the prior art devices.

I claim:

1. A system for determining the pressure within a pressured body comprising transducer means adapted to be placed on the exterior of said body to direct an interrogating sonic signal into said body; passive sonic transponder means adapted to be implanted within said body having a mechanical and sonic resonant frequency varied by said pressure within said body, said transponder means being caused to resonate by receiving said interrogating sonic signal and emitting a different sonic resonance signal; sonic receiver means adapted to be placed on the exterior of said body to receive said sonic resonance signal; and output means connected to said sonic receiver means to convert said sonic resonance signal to data related to said pressure within said pressured body.

2. A method for determining the pressure within a pressured body comprising the steps of implanting a sonic transponder within said pressured body, said transponder having a mechanical and sonic resonance frequency varying with said pressure; directing an interrogating sonic signal at said transponder, causing said transponder to resonate and emit a sonic resonance signal; receiving said sonic resonance signal outside said body; and converting the frequency of said sonic resonance signal to data related to said pressure within said pressured body.

* * * * *